(12) United States Patent
Kawasaki et al.

(10) Patent No.: US 9,186,753 B2
(45) Date of Patent: Nov. 17, 2015

(54) BACK-SHIELDED WELDING METHOD AND WELDED STRUCTURE USING THE SAME

(71) Applicant: MITSUBISHI HITACHI POWER SYSTEMS, LTD., Yokohama, Kanagawa (JP)

(72) Inventors: Kenji Kawasaki, Tokyo (JP); Ryuichi Yamamoto, Tokyo (JP); Shin Nishimoto, Tokyo (JP); Seiichi Kawaguchi, Hyogo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 0 days.

(21) Appl. No.: 14/363,085

(22) PCT Filed: Nov. 29, 2012

(86) PCT No.: PCT/JP2012/080820
§ 371 (c)(1),
(2) Date: Jun. 5, 2014

(87) PCT Pub. No.: WO2013/084777
PCT Pub. Date: Jun. 13, 2013

(65) Prior Publication Data
US 2014/0341642 A1    Nov. 20, 2014

(30) Foreign Application Priority Data

Dec. 8, 2011    (JP) .................................. 2011-268927

(51) Int. Cl.
*B23K 31/02*        (2006.01)
*B23K 9/16*         (2006.01)
(Continued)

(52) U.S. Cl.
CPC .................. *B23K 31/02* (2013.01); *B23K 9/028* (2013.01); *B23K 9/16* (2013.01); *B23K 9/325* (2013.01); *B23K 33/006* (2013.01); *F01D 5/02* (2013.01); *F01D 25/34* (2013.01); *B23K 35/383* (2013.01); *B23K 2201/001* (2013.01); *F05D 2220/31* (2013.01); *F05D 2230/232* (2013.01); *Y10T 403/478* (2015.01)

(58) Field of Classification Search
None
See application file for complete search history.

(56) References Cited

U.S. PATENT DOCUMENTS 3,082,318 A * 3/1963 Heath et al. ............... 219/137 R
3,849,871 A * 11/1974 Kaunitz ..................... 228/169
(Continued)

FOREIGN PATENT DOCUMENTS

CN    2788955 Y    6/2006
JP    62151274 A * 7/1987 ............... B23K 9/02
(Continued)

OTHER PUBLICATIONS

International Search Report dated Feb. 19, 2013 issued in corresponding application No. PCT/JP2012/080820.
(Continued)

*Primary Examiner* — Kiley Stoner
(74) *Attorney, Agent, or Firm* — Westerman, Hattori, Daniels & Adrian, LLP

(57) ABSTRACT

A back-shielded welding method according to the present invention includes communicating a front surface-side and a back surface-side of two welding base materials (2, 3) with each other in the welding base materials (2, 3) that abut against each other; forming notched portions (21, 22) in abutting edge portions (15, 16) of two welding base materials (2, 3) in such a manner that a slit-shaped gas supply opening (17) is formed to extend along a forming direction of a welding bead; forming the gas supply opening (17) with the notched portions (21, 22) by abutting the abutting edge portions (15, 16) of the welding base materials (2, 3) against each other and temporarily fixing the abutting edge portions (15, 16); and forming the welding bead while supplying an inert gas via the gas supply opening (17), and blocking the gas supply opening (17) by the welding bead.

3 Claims, 7 Drawing Sheets

(51) Int. Cl.
*B23K 9/028* (2006.01)
*B23K 9/32* (2006.01)
*B23K 33/00* (2006.01)
*F01D 5/02* (2006.01)
*F01D 25/34* (2006.01)
*B23K 35/38* (2006.01)

(56) References Cited

U.S. PATENT DOCUMENTS

| | | | |
|---|---|---|---|
| 4,030,849 A * | 6/1977 | Keifert et al. | 403/272 |
| 4,084,739 A * | 4/1978 | Koltz et al. | 228/168 |
| 4,278,864 A * | 7/1981 | De Facci et al. | 219/75 |
| 4,454,405 A * | 6/1984 | Riley | 219/61 |
| 5,669,547 A * | 9/1997 | Spring | 228/219 |
| 5,944,247 A * | 8/1999 | Jankus | 228/42 |
| 6,180,918 B1 * | 1/2001 | Semenov et al. | 219/137 WM |
| 2010/0028155 A1 * | 2/2010 | Nishioka et al. | 416/223 A |
| 2010/0224595 A1 * | 9/2010 | Choi | 219/59.1 |
| 2011/0198318 A1 | 8/2011 | Silvia et al. | |
| 2012/0261459 A1 * | 10/2012 | Bruck | 228/178 |
| 2014/0023432 A1 * | 1/2014 | Matsuhashi et al. | 403/272 |
| 2014/0027426 A1 * | 1/2014 | Hutchison et al. | 219/130.5 |
| 2014/0042140 A1 * | 2/2014 | Lin et al. | 219/137 R |

FOREIGN PATENT DOCUMENTS

| | | | |
|---|---|---|---|
| JP | 03234368 A * | 10/1991 | B23K 9/167 |
| JP | 6-262350 A | 9/1994 | |
| JP | 2002-144038 A | 5/2002 | |
| JP | 3996825 B2 | 10/2007 | |
| JP | 3999402 B2 | 10/2007 | |
| JP | 2008-137042 A | 6/2008 | |
| JP | 4146282 B2 | 9/2008 | |
| JP | 2009-113112 A | 5/2009 | |
| JP | 2010-31812 A | 2/2010 | |
| JP | 2011-177790 A | 9/2011 | |
| JP | 2012-202225 A | 10/2012 | |
| WO | 2007/111453 A1 | 10/2007 | |

OTHER PUBLICATIONS

Written Opinion of the International Searching Authority dated Feb. 19, 2013 issued in corresponding application No. PCT/JP2012/080820.

Office Action dated Jul. 31, 2015, issued in counterpart Chinese application No. 201280060492.2, with English translation. (13 pages).

* cited by examiner

BACK-SHIELDED WELDING METHOD AND WELDED STRUCTURE USING THE SAME

TECHNICAL FIELD

The present invention relates to a back-shielded welding method in which welding is performed by abutting two welding base materials against each other, and by forming a welding bead in such a manner that the welding bead is formed to be melted into a back surface-side from a front surface-side of the welding base materials while supplying an inert gas to the back surface-side thereof, and to a welded structure fabricated by using the back-shielded welding method.

BACKGROUND ART

In a product such as a steam turbine rotor that is assembled by welding a plurality of components, a so-called back bead welding, in which a welding bead is formed to be melted into a back surface-side of a welding base material, is performed to improve welding strength of the product. At this time, the welding is performed by supplying an inert gas such as argon or helium from a back surface-side and a front surface-side of a welded connection portion to replace air with the inert gas and thus, the welding bead is not in contact with oxygen. As a result, welding defects are prevented from occurring, and joint performance resulting from oxidation of the welding bead is prevented from deteriorating. The welding that is performed in this way while supplying the inert gas from the back side of the welded connection portion is referred to as a back-shielded welding.

For example, as described in PTL 1, when a steam turbine rotor has a structure in which an inspection hole is provided in a region proximate to a welded portion, the back-shielded welding can be performed by using the inspection hole. However, in a steam turbine rotor without an inspection hole, since a hollow portion on a back surface-side of welding base materials is sealed, the back-shielded welding cannot be performed as it is. For this reason, a method is adopted in which abutting edge portions of the welding base materials are abutted against each other and are temporarily fixed, a round gas supply hole is punctured through an abutting portion, a tube is inserted into the gas supply hole, welding is performed while injecting an inert gas via the gas supply hole, and finally the gas supply hole is blocked by the welding bead.

For example, in a structure to which it is difficult to apply the back-shielded welding, PTL 2 discloses a welding method in which a back receiving portion is formed in abutting edge portions of welding base materials to cover a back side of a welded connection portion, welding is performed in such a manner that the back receiving portion is melted and thus, the welding is performed in a state where the back is not shielded.

PTL 3 discloses a welding method in which even though a back is not shielded, compositions of the welding base materials are adjusted in such a manner that a welding bead does not excessively oxidize and thus, defects in a welded connection portion are prevented from occurring.

CITATION LIST

Patent Literature

[PTL 1] Japanese Patent No. 3999402
[PTL 2] Japanese Unexamined Patent Application Publication No. 2010-31812
[PTL 3] Japanese Unexamined Patent Application Publication No. 2008-137042

SUMMARY OF INVENTION

As described above, in the welding method in which an inert gas is injected via the round gas supply hole that is punctured through the abutting portion of the abutting edge portions of the welding base materials, unless the gas supply hole is a certain size in diameter, it takes some time to replace the inert gas with air. In contrast, when the diameter of the gas supply hole is great compared to the width of a groove tip portion that forms the abutting edge portion of the welding base material and a cross-sectional shape of the groove tip portion changes rapidly, there is a problem in that when the welding approaches the gas supply hole, heat accumulates in a circumference of the gas supply hole, the groove tip portion melts down and thus, welding defects occur. Even though the groove tip portion does not melt down, the width of the welding bead tends to increase in a region in which the gas supply hole is positioned, and the non-uniform width of the welding bead leads to deterioration in welding quality.

When the thicknesses of the welding base materials are great, there is a problem in that the groove tip portion is placed at a deep position from the front surface-side of the welding base materials, a long drill is required to puncture the gas supply hole at the position, the drill is likely to move during the puncturing and thus, the puncturing becomes difficult.

In the welding method disclosed in PTL 2, there is a problem in that since the back receiving portion to cover a back side of the welded connection portion should be formed in the abutting edge portions of the welding base materials, and the welding is performed in such a manner that the back receiving portion does not melt, the back receiving portion has a slit in a cross-section thereof after the welding is completed, and stress concentration occurs.

In the welding method disclosed in PTL 3, since the compositions of the welding base materials are adjusted in such a manner that the welding can be performed in a state where the back is not shielded, there is limitation in composition ranges of the base materials, and strength of the welding base materials and the welding bead are substantially compromised compared to when using the welding base materials compositions of which are not adjusted and shielding the back.

The present invention is made in light of the problems, and in a structure in which it is difficult to shield a back, an object of the present invention is to provide a back-shielded welding method in which it is possible to facilitate shielding of the back and to improve welding quality by being able to supply an inert gas to a back surface-side from a front surface-side of a welded connection portion without occurrence of welding defects and deterioration in joining performance, and to provide a welded structure fabricated by using the back-shielded welding method.

Solution to Problem

The present invention is to provide the following means to achieve the object. A back-shielded welding method according to a first aspect of the present invention is a welding method in which welding is performed by forming a welding bead in such a manner that the welding bead is formed to be melted into a back surface-side from a front surface-side of two welding base materials while abutting the welding base materials against each other and supplying an inert gas from the back surface-side thereof. The back-shielded welding method includes communicating the front surface-side and the back surface-side of the welding base materials with each other at a joint of the abutted two welding base materials, and forming a notched portion in at least one abutting edge portion in such a manner that a slit-shaped gas supply opening is formed to extend along a forming direction of the welding bead; forming the gas supply opening with the notched portion by abutting the abutting edge portions of the welding base materials against each other and temporarily fixing the abutting edge portions; and forming the welding bead while supplying an inert gas via the gas supply opening, and blocking the gas supply opening by the welding bead.

According to the back-shielded welding method, even in a welded structure in which it is difficult to shield the back, the back-shielded welding is performed while the inert gas is supplied to the back surface-side from the front surface-side of the welding base materials via the gas supply opening that is formed in a slit shape, and it is possible to easily perform the back-shielded welding without deteriorating welding joint characteristics resulting from oxidation of the welding bead.

Since the gas supply opening is formed in a slit shape to extend along the formation direction of the welding bead, compared to when the round gas supply hole of the related art is provided, the slit-shaped gas supply opening can have an opening area equal to or greater than that of the round gas supply hole, and can have a remarkably narrow width. For this reason, even in a region in which the gas supply opening is formed, a cross-sectional shape of a groove tip portion of the welding base materials does not change rapidly, when the welding approaches the gas supply opening, heat is prevented from accumulating in a circumference of the gas supply opening and thus, it is possible to prevent the groove tip portion from melting down as in the related art.

When the gas supply opening formed in a slit shape is blocked by the welding bead, the width of the gas supply opening is narrower than that of the round gas supply hole of the related art. Accordingly, it is possible to block the gas supply opening. For this reason, it is possible to uniformly form the welding bead in both regions in which the gas supply opening is formed and is not formed, and it is possible to improve welding quality.

In the back-shielded welding method according to a second aspect of the present invention in relation to the first aspect, the notched portion may be formed in only one of the abutting edge portions of two welding base materials.

As described above, when the notched portion is formed in only one of the abutting edge portions, a processing depth of the notched portion is doubled, and it is not necessary to process the notched portion in the other abutting edge portion. Accordingly, a pre-stage process before the welding operation of the welding base material can be easily performed.

When the notched portions are formed in both abutting edge portions and are aligned with each other, when positions of the notched portions deviate from each other, the opening area of the gas supply opening decreases to the extent that the positions of the notched portions deviate from each other. However, when the notched portion is formed in only one abutting edge portion, the deviation in position of the notched portion cannot occur and thus, there is no concern that the opening area of the gas supply opening decreases. In addition, it is possible to reduce effort of aligning the positions of the notched portions with each other.

The back-shielded welding method according to a third aspect of the present invention in relation to the first or the second aspect may have a configuration in which the inert gas is supplied via a flat gas supply tube, and the gas supply opening has a width and a length of the minimum necessary dimension to allow the gas supply tube to be inserted through the gas supply opening.

In this way, when the inert gas is supplied via the flat gas supply tube, and the gas supply opening has the minimum necessary dimensions to allow the flat gas supply tube to be inserted through the gas supply opening, it is possible to significantly reduce the opening area (the width) of the gas supply opening without decreasing a supply flow rate of the inert gas compared to the round gas supply hole. Accordingly, it is possible to more effectively prevent the melt-down of the groove tip portion which results from accumulation of heat in the circumference of the gas supply opening when the welding approaches the gas supply opening. In addition, since the width of the gas supply opening is narrow, the gas supply opening is more easily blocked by the welding bead, and the welding bead is uniformly formed. As a result, it is possible to improve welding quality.

A welded structure according to a fourth embodiment of the present invention in relation to any one of the first to the third aspects is manufactured by using the back-shielded welding method.

Since the welded structure is manufactured by performing welding in a state where the back is completely shielded, it is possible to provide the high-quality welded structure without welding defects or performance deterioration in joint portions.

Advantageous Effects of Invention

As described above, according to the back-shielded welding method of the present invention, in the structure in which it is difficult to shield the back, it is possible to facilitate the shielding of the back and to improve welding quality by supplying an inert gas to the back surface-side from the front surface-side of the welded connection portion without causing defects of the welded connection portion.

Since welding is performed on the welded structure according to the present invention by using the back-shielded welding method in a state where the back is completely shielded, it is possible to provide the high-quality welded structure without welding defects or performance deterioration in joint portions.

DESCRIPTION OF EMBODIMENTS

Hereinafter, embodiments of the present invention will be described with reference to FIGS. 1 to 12.

Figure 1:
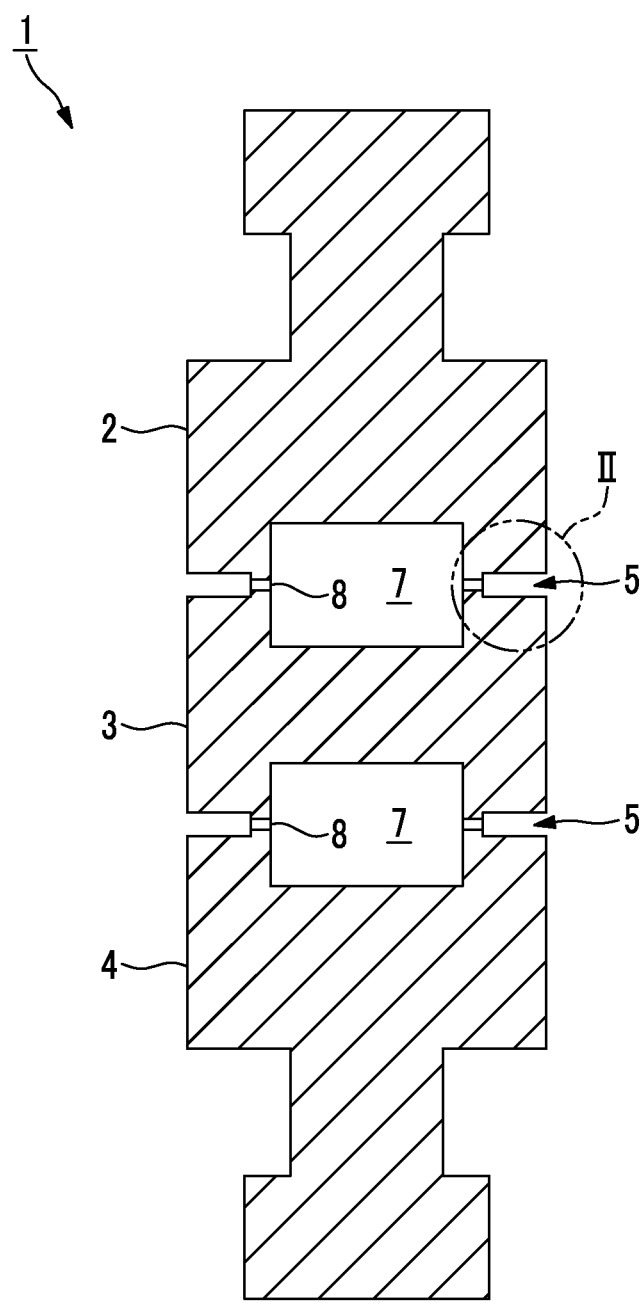
FIG. 1 is a longitudinal cross-sectional view of a steam turbine rotor illustrating an example of a welded structure to which a back-shielded welding method according to the present invention is applicable.

FIG. 1 is a longitudinal cross-sectional view of a steam turbine rotor illustrating an example of a welded structure to which a back-shielded welding method according to the present invention is applicable. Since the steam turbine rotor is very large and very heavy, and it is difficult to integrally form the steam turbine rotor, typically, the steam turbine rotor adopts a structure in which a plurality of rotor discs are disposed concentrically in an axial direction, and each of the rotor discs is welded to integrally form the steam turbine rotor. For example, three rotor discs 2, 3 and 4 (welding base materials) are disposed in an axial direction, and three rotor discs 2, 3 and 4 are welded with high strength in two welded connection portions 5 to be integrated into a steam turbine rotor 1.

A bore (a hollow portion) 7 for weight reduction is formed inside the steam turbine rotor 1. The bore 7 maintains a sealed space by aligning concave portions formed in end surfaces of the rotor discs 2, 3 and 4 with each other. A back bead welding is performed in each of the welded connection portions 5 in such a manner that a welding bead 8 (refer to FIG. 6 as well) melts to a back surface-side from a front surface-side of each of the rotor discs 2, 3 and 4, which are the welding base materials, to improve welding strength. At this time, the welding is performed by supplying an inert gas such as argon or helium from the back surface-side and the front surface-side of the welded connection portion 5 to replace air with the inert gas and thus, the welding bead 8 is not in contact with oxygen in air. As a result, welding defects are prevented from occurring, and Joint performance resulting from oxidation is prevented from deteriorating.

First Embodiment

Hereinafter, a first embodiment of the back-shielded welding method according to the present invention will be described.

Figure 2:
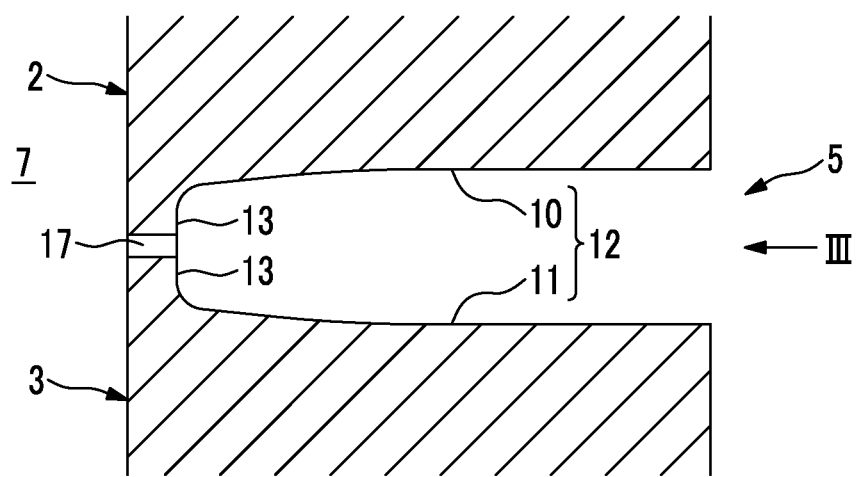
FIG. 2 is a longitudinal cross-sectional view of a welded connection portion before being welded, which is illustrated by magnifying II portion in FIG. 1.
Figure 3:
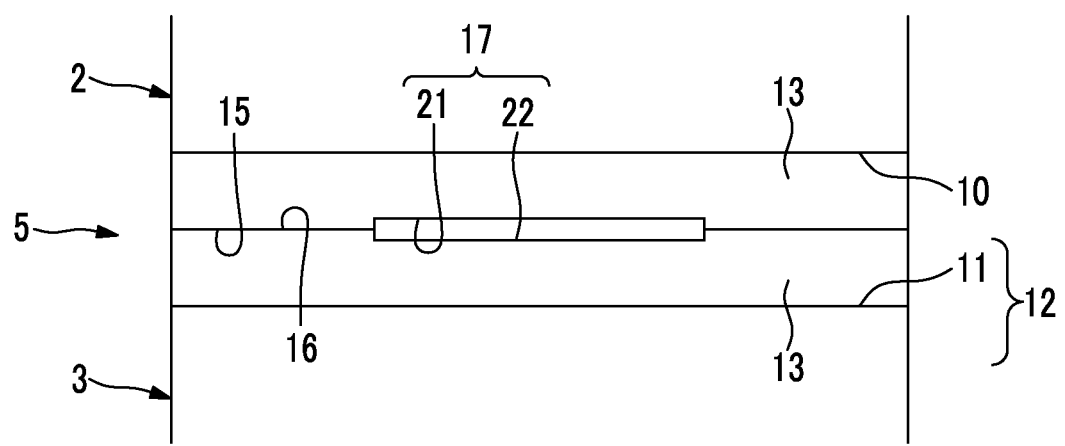
FIG. 3 is a front view of the welded connection portion before being welded illustrating a first embodiment of the present invention when a front surface-side of the welded connection portion is seen from arrow III in FIG. 2.

FIG. 2 is a longitudinal cross-sectional view of the welded connection portion 5 before being welded, which is illustrated by magnifying II portion in FIG. 1. FIG. 3 is a front view of the welded connection portion 5 before being welded illustrating the first embodiment of the present invention when the welded connection portion 5 is seen from arrow III in FIG. 2. A cross section of the welded connection portion 5 before being welded has a U shape 12 by forming half grooves 10 and 11 each of which having a substantially J shape, respectively, in abutting edge portions 15 and 16 (refer to FIG. 3) of the rotor discs 2 and 3 (or 3 and 4) that abut against each other, and by aligning the half grooves 10 and 11 with each other, that is, the welded connection portion 5 has a U-shaped groove. Herein, a bottom portion of the U-shaped groove 12 is referred to as a groove tip portion 13.

It is necessary to inject an inert gas into the sealed bore 7 so that the inert gas can be supplied to the back surface-side of the welded connection portion 5. For this reason, after the abutting edge portions 15 and 16 (end surfaces of the groove tip portions 13) of the rotor discs 2 and 3 are abutted against each other and are temporarily fixed, as illustrated in FIG. 4, a gas supply tube 19 is inserted through a gas supply opening 17 formed in a joint of the abutting edge portions as described below, and an inert gas is injected therethrough and is replaced with air in the bore 7.

As illustrated in FIG. 3, the gas supply opening 17 is formed by abutting the abutting edge portions 15 and 16 against each other in such a manner that notched portions 21 and 22 preformed in the abutting edge portions 15 and 16 by milling or the like align with each other, and by temporarily fixing the abutting edge portions 15 and 16. The gas supply opening 17 communicates the front surface-side (the outside) of the rotor discs 2 and 3 with the back surface-side (the space of the bore 7) thereof, and is formed in a slit shape to extend along a formation direction of the welding bead 8, that is, a longitudinal direction of the groove tip portion 13. Two to four gas supply openings 17 are provided at equal intervals in a circumferential direction of one of the welded connection portions 5. The gas supply opening 17 functions as a gas release opening through which excessive inert gas supplied into the bore 7 is discharged to the outside, which will be described later.

Figure 4:
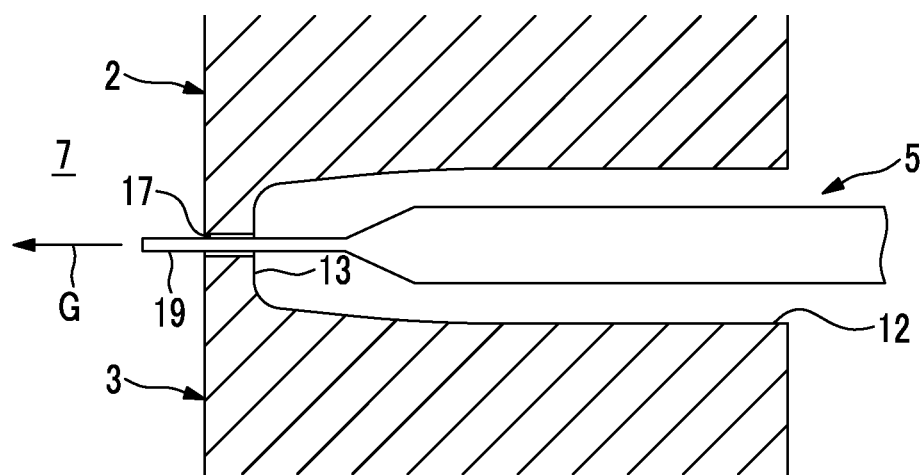
FIG. 4 is a longitudinal cross-sectional view of the welded connection portion illustrating a state where an inert gas is supplied via a gas supply opening.

As illustrated in FIG. 4, a gas supply tube 19 inserted into the slit-shaped gas supply opening 17 desirably has a flat shape. When the flat gas supply tube is adopted, even though the width of the gas supply opening 17 is narrow, it is possible to increase a supply flow rate of an inert gas G via therethrough, and to reduce the time which it takes to replace the inert gas with air in the bore 7. Furthermore, the gas supply opening 17 preferably has a width and a length of the minimum necessary dimension to allow the gas supply tube 19 to be inserted through the gas supply opening 17. For example, it is possible to propose the gas supply opening 17 having a width of approximately 1 mm to 2 mm and the length of approximately tens of millimeters.

Figure 5:
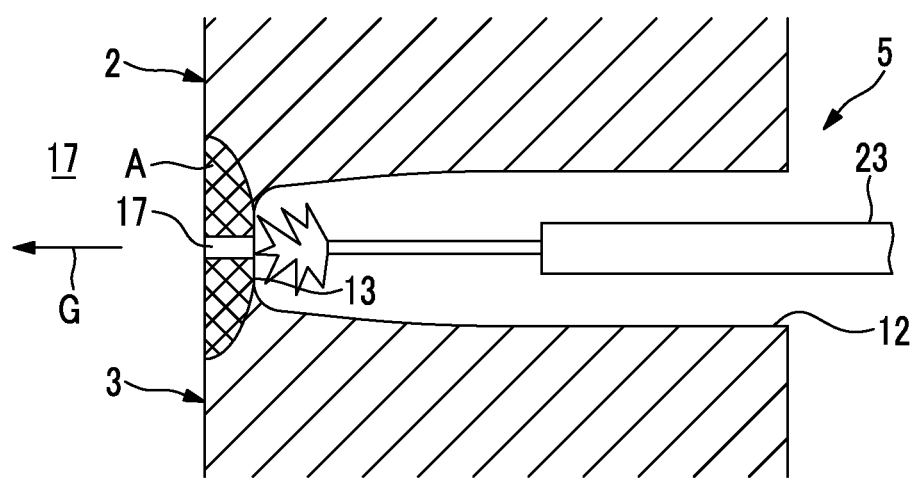
FIG. 5 is a longitudinal cross-sectional view of the welded connection portion illustrating a state where a groove tip portion is being welded.
Figure 6:
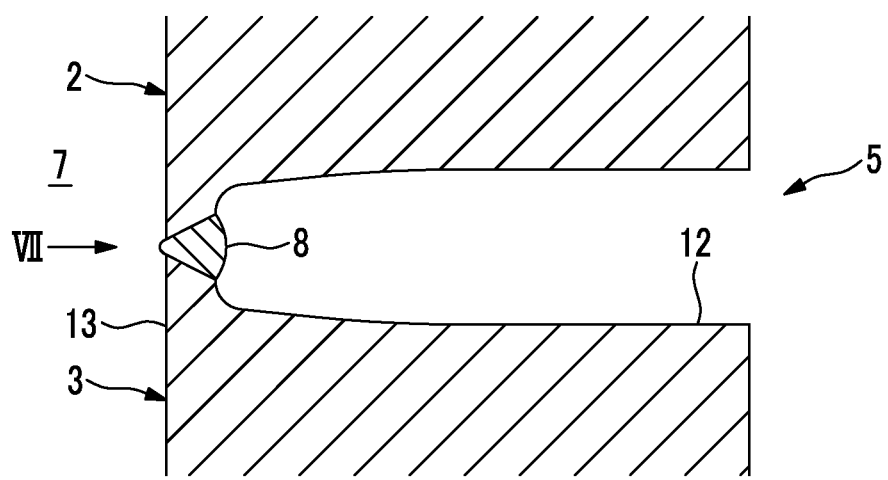
FIG. 6 is a longitudinal cross-sectional view of the welded connection portion in which the welding of the groove tip portion is completed and a welding bead is formed.

As illustrated in FIG. 5, discharge welding (mainly Tig welding) is performed by using a welding torch 23, and as illustrated in FIG. 6, the welding bead 8 is formed. The welding bead 8 is formed in such a manner that the welding bead 8 melts to the back surface-side from the front surface-side of the welding base materials (rotor discs 2 and 3). At this time, the inert gas is supplied into the U-shaped groove 12 from the front surface-side of the welded connection portion 5 by gas supply means that is not illustrated, and the inert gas is supplied even to the back surface-side of the welded connection portion 5 via the gas supply opening 17 described above. Accordingly, during the welding, the welding bead 8 is completely shielded from air, and oxidation resulting from contact of the welding bead 8 with air is prevented. As a result, welding defects are prevented from occurring, and joint performance is prevented from deteriorating.

In two to four gas supply openings 17 that are provided at equal intervals in the circumferential direction of one of the welded connection portions 5, while the inert gas is supplied via one of gas supply openings 17, air and excessive inert gas in the bore 7 are discharged via the other gas supply openings 17. Accordingly, air in the bore 7 is completely replaced with the inert gas.

Figure 7:
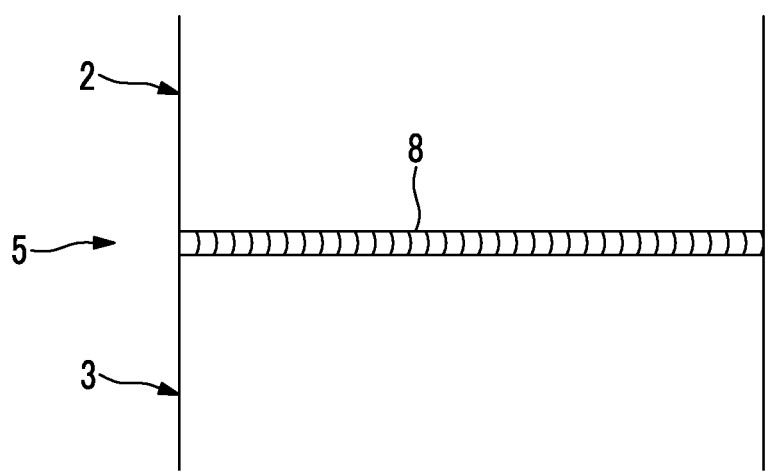
FIG. 7 is a front view of the welded connection portion when a back surface-side of the welded connection portion is seen from arrow VII in FIG. 6.

As described above, the welding bead 8 is formed, and at the same time, the gas supply openings 17 are sequentially blocked by the welding beads 8. Since the gas supply opening 17 is a slit shape that has a narrow width, it is possible to easily block the gas supply opening 17 by the welding bead 8, and as illustrated in FIG. 7, it is possible to uniformly form the width of the welding bead 8 when the welding bead 8 is seen from the back surface-side of the welded connection portion 5.

Figure 8:
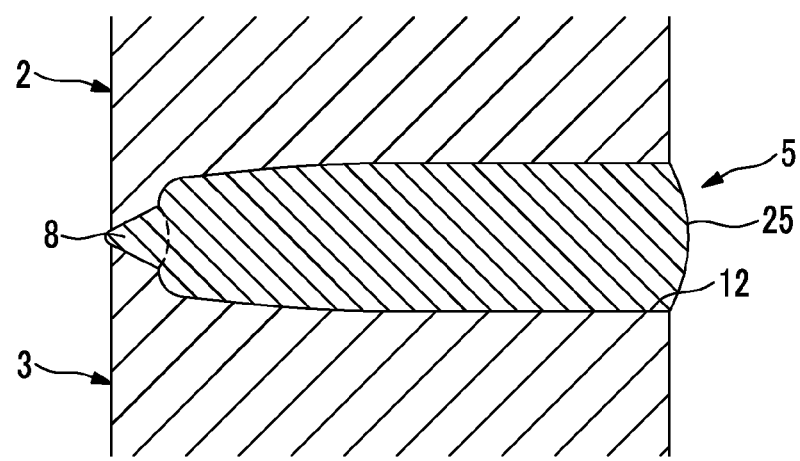
FIG. 8 is a longitudinal cross-sectional view of the welded connection portion when a main welding is completed.

Thereafter, as illustrated in FIG. 8, main welding is performed while a welding material 25 melts into the U-shaped groove 12, and the inside of the U-shaped groove 12 is filled with the welding material 25. Since the inert gas is supplied from the front surface-side of the welded connection portion 5 even in the middle of the main welding, the welding bead 8 and the welding material 25 do not oxidate.

Two to four gas supply openings 17 provided at equal intervals in the circumferential direction of one of the welded connection portions 5 is sequentially blocked by the welding, and when the last gas supply opening 17 is blocked up, the bore 7 is sealed in a state where the bore 7 is filled with the inert gas. For this reason, there is no residual air in the bore 7, thereby preventing internal corrosion of the rotor discs 2, 3 and 4, which results from water, impurities or the like in the air.

As described above, the back-shielded welding method according to the embodiment is a welding method in which the slit-shaped gas supply opening 17 is formed in the joint of the welded connection portion 5 (the groove tip portion 13) to extend along the formation direction of the welding bead 8, and welding is performed while supplying the inert gas from the back surface-side of the welded connection portion 5.

For this reason, compared to when the round gas supply hole of the related art is provided, the slit-shaped gas supply opening 17 can have an opening area equal to or greater than that of the round gas supply hole, and can have a remarkably narrow width. At a position of the gas supply opening 17, the width of the groove tip portion 13 increases to the extent that the width of the gas supply opening 17 decreases, and the cross-sectional shape of the groove tip portion 13 is prevented from changing at the position rapidly.

Accordingly, when the welding approaches the position of the gas supply opening 17, heat is likely to escape from a region A (refer to FIG. 5) in a circumference of the gas supply opening 17. For this reason, it is possible to prevent occurrence of such welding defects that heat accumulate in the vicinity of the gas supply opening 17 and thus, the groove tip portion 13 melts down.

When the slit-shaped gas supply opening 17 is blocked by the welding bead 8, the width of the gas supply opening 17 is remarkably narrower than that of the round gas supply hole of the related art. Accordingly, it is possible to easily block the gas supply opening 17. For this reason, it is possible to uniformly form the welding bead 8 in both regions in which the gas supply opening 17 is formed and is not formed, and it is possible to improve welding quality.

Since the inert gas is supplied via the flat gas supply tube 19, and the gas supply opening 17 has a width and a length of the minimum necessary dimension to allow the gas supply tube 19 to be inserted through the gas supply opening 17, it is possible to significantly reduce the opening area (the width) of the gas supply opening 17 without decreasing a supply flow rate of the inert gas compared to the round gas supply hole.

Accordingly, it is possible to more effectively prevent the melt-down of the groove tip portion 13 which results from accumulation of heat in the circumference of the gas supply opening 17 when the welding approaches the gas supply opening 17. In addition, since the width of the gas supply opening 17 is narrow, the gas supply opening 17 is more easily blocked by the welding bead 8, and the welding bead 8 is uniformly formed. As a result, it is possible to improve welding quality.

Figure 9:
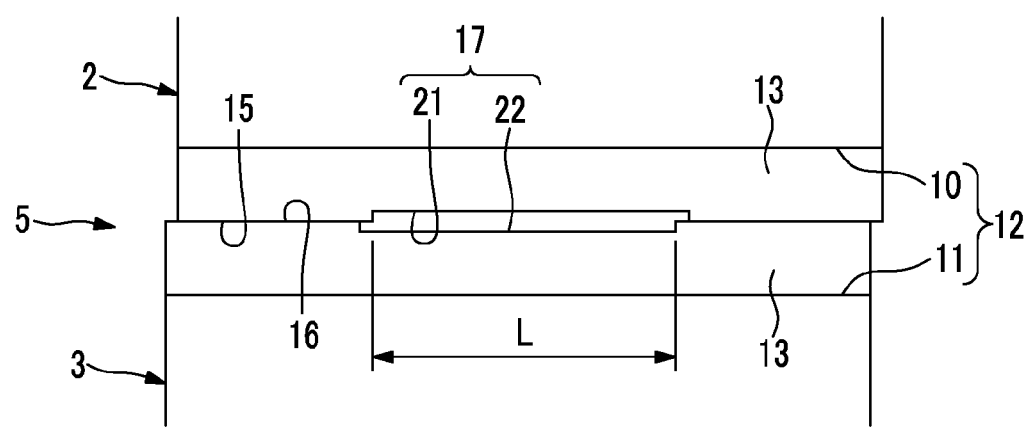
FIG. 9 is a front view of the welded connection portion illustrating a state where positions of notched portions forming the slit-shaped gas supply opening deviate from each other.

Furthermore, as illustrated in FIG. 9, even though positions of one notched portion 21 and the other notched portion 22 forming the gas supply opening 17 slightly deviate from each other, an effective dimension L in a length direction of the gas supply opening 17 decreases at a small rate. Accordingly, it is possible to insert the flat gas supply tube 19 into the gas supply opening 17 to inject the inert gas therethrough.

Figure 10:
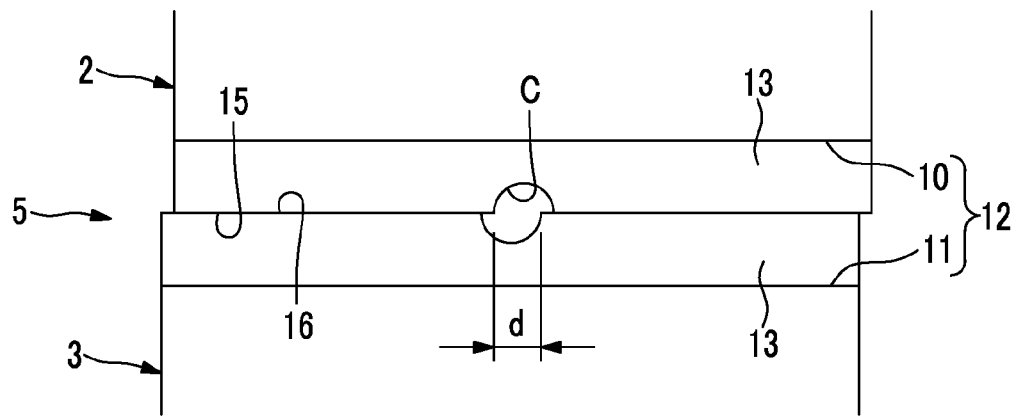
FIG. 10 is a front view of the welded connection portion illustrating a state where positions of notched portions forming a round gas supply hole deviate from each other.

In contrast, as illustrated in FIG. 10, when positions of notched portion C forming the round gas supply hole of the related art deviate from each other, an effective diameter d of the insertable gas supply tube becomes remarkably small. For example, when the notched portion C with the diameter of 5 mm deviates from a normal position thereof by 1 mm, the effective diameter d of the insertable gas supply tube is limited to only 3 mm.

Second Embodiment

A second embodiment of the back-shielded welding method according to the present invention will be described.

Figure 11:
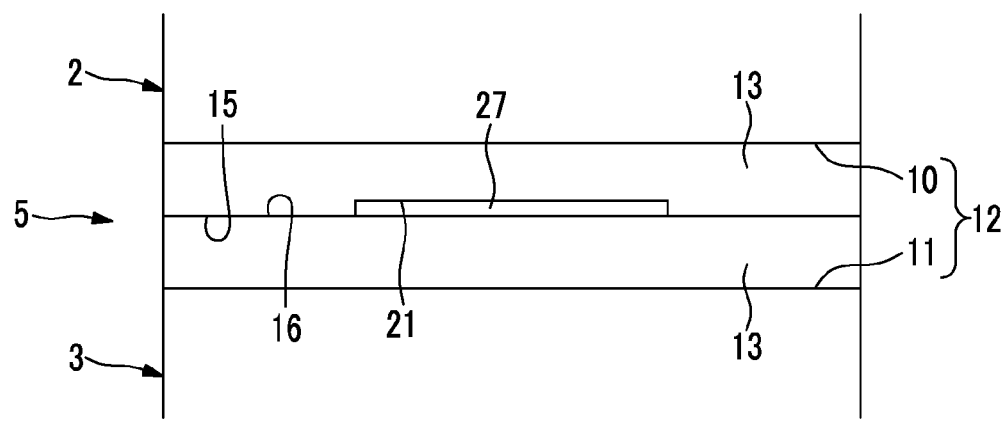
FIG. 11 is a front view of a welded connection portion before being welded illustrating a second embodiment of the present invention.

FIG. 11 is a front view of a welded connection portion illustrating the second embodiment of the present invention. Herein, in two abutted rotor discs 2 and 3 (or 3 and 4), the notched portion 21 is formed in only one of the abutting edge portion 15 (the groove tip portion 13), and the other abutting edge portion 16 is flat. When two rotor discs 2 and 3 align with each other, an opening of the notched portion 21 formed in the rotor disc 2 is sealed by the other rotor disc 3, and similarly to in the first embodiment, a slit-shaped gas supply opening 27 is formed to extend along the formation direction of the welding bead 8. A configuration of the other portions and a function of the gas supply opening 27 are the same as those of the first embodiment.

In this way, when the notched portion 21 is formed in only one of the abutting edge portion 15 of the rotor disc 2, the processing depth of the notched portion 21 becomes double compared to the gas supply opening 17 in the first embodiment. Since it is not necessary to process the notched portion in the other abutting edge portion 16 of the rotor disc 3, a pre-stage process before the welding operation of the rotor disc 3 can be easily performed.

As in the first embodiment, when the gas supply opening 17 is formed by forming the notched portions 21 and 22 in both abutting edge portions 15 and 16, and the positions of the notched portions 21 and 22 deviate from each other, the opening area of the gas supply opening 17 decreases to the extent that the positions of the notched portions 21 and 22 deviate from each other. However, as in the second embodiment, when the notched portion 21 is formed in only the abutting edge portion 15, deviation in position of the notched portion 21 cannot occur and thus, there is no concern that the opening area of the gas supply opening 27 decreases. In addition, it is possible to reduce effort of aligning the position of the notched portion 21.

Third Embodiment

Figure 12:
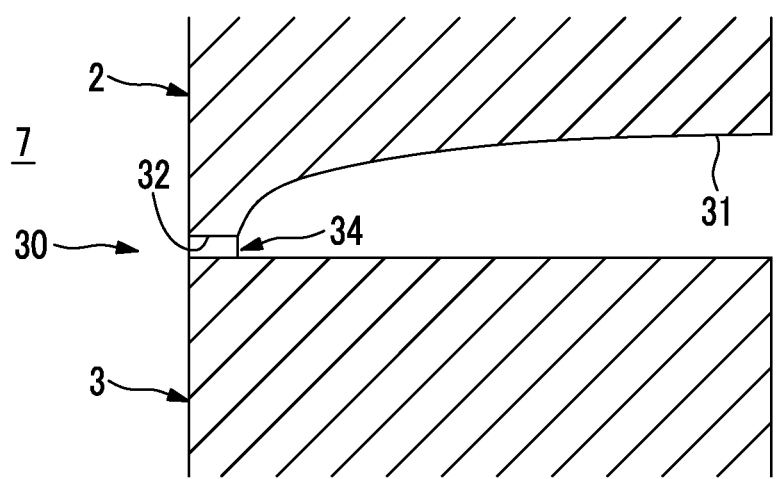
FIG. 12 is a longitudinal cross-sectional view of a welded connection portion before being welded illustrating a third embodiment of the present invention.

FIG. 12 is a longitudinal cross-sectional view of a welded connection portion illustrating a third embodiment of the present invention. In a cross-sectional shape of a welded connection portion 30, a substantially J-shaped half groove 31 and a notched portion 32 are formed in only one of the abutted rotor discs 2 and 3 (or 3 and 4), for example, on the rotor disc 2 side, and a half groove and a notched portion are not formed in the other rotor disc 3. When the rotor discs 2 and 3 are aligned with each other, that is, when a J-shaped groove is formed, the notched portion 32 is sealed by the rotor disc 3, and a gas supply opening 34 is formed. A function of the gas supply opening 34 is the same as that of the gas supply opening 17 in the first embodiment.

As such, in the back shield welding method according to the present invention, the shape of a groove is not limited to the U shape illustrated in the first embodiment, and the present invention is applicable to the J-shaped groove and grooves of other shapes. Furthermore, the present invention is applicable even to butt welding in addition to the groove shape welding.

The present invention is not limited to the configuration of each of the embodiments. Modifications or improvements can be appropriately made to the present invention insofar as the modifications or the improvements do not depart from the spirit of the present invention, and the scope of rights of the present invention includes embodiments to which the modifications or the improvements are applied.

For example, the embodiments describe examples that the back-shielded welding method according to the present invention is applied to the welding of the rotor discs 2, and 4 that form the steam turbine rotor 1, but the application of the present invention is not limited to the steam turbine rotor, and the present is applicable to other welded structures to which it is difficult to apply the back-shielded welding. For example, the present invention is suitable for a welding of steel pipes having great thicknesses. Furthermore, a target object to be welded may not have a tubular shape.

REFERENCE SIGNS LIST

1: steam turbine rotor
2, 3, 4: rotor disc (welding base material)
5, 30: welded connection portion
7: bore
8: welding bead
10, 11, 31: half groove
12: U-shaped groove
13: groove tip portion
15, 16: abutting edge portion
17, 27, 34: gas supply opening
19: gas supply tube
21, 22, 32; notched portion
25: welding material
G: inert gas

The invention claimed is:

1. A back-shielded welding method of performing welding is performed by forming a welding bead in such a manner that the welding bead is formed to be melted into a back surface-side from a front surface-side of two welding base materials while supplying an inert gas from the back surface-side thereof, the method comprising:
   communicating the front surface-side and the back surface-side of two welding base materials with each other at a joint of the abutted two welding base materials, at least one abutting edge portion having a notched portion in such a manner that a slit-shaped gas supply opening is formed to extend along a forming direction of the welding bead, wherein the notched portion is preformed in the at least one abutting edge portion, wherein the at least one abutting edge portion is to be abutted to another abutting edge portion;
   forming the gas supply opening with the notched portion by abutting the abutting edge portions of the welding base materials against each other and temporarily fixing the abutting edge portions; and
   forming the welding bead while supplying an inert gas via the gas supply opening, and blocking the gas supply opening by the welding bead.

2. The back-shielded welding method according to claim 1, wherein the notched portion is formed in only one of the abutting edge portions of two welding base materials.

3. The back-shielded welding method according to claim 1, wherein the inert gas is supplied via a flat gas supply tube, and the gas supply opening has a width and a length of the minimum necessary dimension to allow the gas supply tube to be inserted through the gas supply opening.

* * * * *